United States Patent [19]

Langston

[11] Patent Number: 4,500,556

[45] Date of Patent: Feb. 19, 1985

[54] ANTHOCYANIN COLORANT FROM GRAPE POMACE

[75] Inventor: Metty S. K. Langston, Ossining, N.Y.

[73] Assignee: General Foods Corporation, White Plains, N.Y.

[21] Appl. No.: 486,599

[22] Filed: Apr. 19, 1983

Related U.S. Application Data

[63] Continuation-in-part of Ser. No. 363,759, Mar. 31, 1982, abandoned.

[51] Int. Cl.$^3$ .................. A23L 1/277; A23L 1/272
[52] U.S. Cl. ........................ 426/540; 426/250; 426/429; 426/431; 426/425; 426/590; 8/438
[58] Field of Search ............ 426/250, 540, 429, 431, 426/425, 590; 8/438

[56] References Cited

U.S. PATENT DOCUMENTS

| | | | |
|---|---|---|---|
| 3,737,324 | 6/1973 | Zinchenko et al. | 426/52 |
| 4,083,779 | 4/1978 | Combe et al. | 426/540 |
| 4,260,388 | 4/1981 | Mirabel | 426/250 |
| 4,320,009 | 3/1982 | Hilton | 426/540 |

OTHER PUBLICATIONS

Marmion, D. M., Handbook of U.S. Colorants for Foods Drugs, and Cosmetics, Wiley-Intersci. Pub. Wiley & Sons, NY, pp. 89–90.

*Primary Examiner*—Jeanette Hunter
*Attorney, Agent, or Firm*—Sam D. Walker; Joseph T. Harcarik; Daniel J. Donovan

[57] ABSTRACT

Grape pomace is contacted with an aqueous extraction solvent containing $HSO_3^-$ ions to form anthocyanin-$(HSO_3)$ complex. The complex is recovered by treating the liquid extract phase with a non-ionic adsorbent to adsorb the complex. Anthocyanin colorant, free of the $HSO_3^-$ ions is recovered by elution with an acidified organic solvent for anthocyanin. The anthocyanin colorant may be provided in dry form by drying the solvent solution. This process allows us to remove sugars, organic acids, polymerized anthocyanin pigment and other water soluble material, thus providing a highly "colored" monomeric anthocyanin pigment. The anthocyanin colorant produced by this process is at least 10 times more concentrated than that produced by conventional methods and about two times stronger than most of the concentrated pigment.

11 Claims, No Drawings

ANTHOCYANIN COLORANT FROM GRAPE POMACE

This application is a continuation-in-part of Ser. No. 06/363,759, which was filed on Mar. 31, 1982 and is presently abandoned.

BACKGROUND OF THE INVENTION

This invention relates to colorants suitable for use in food products, to food products containing same, and to methods of obtaining the colorants.

Colorants in foods are either natural pigments or synthetic dyes or lakes. Since the number of synthetic colors is limited, there is need to further explore natural pigments as colorants. More specifically, there is extensive research in finding suitable natural red pigments as color additives.

The present invention relates in particular to an anthocyanin colorant obtained by extraction from grape pomace. These anthocyanin colorants are well known, but conventional extraction methods result in products having a generally low color strength.

Daniel Marmion., "*Handbook of U.S. Colorants For Foods, Drugs, and Cosmetics,*" pages 89–90 teaches the extraction of anthocyanin from grape skin extract by the addition of sulfur dioxide during the steeping process. The extract is then concentrated by vacuum evaporation to remove the alcohol formed during fermentation of the extracted sugars. Charobago et al., "*Ion Exchange Purified Anthocyanin Pigments As A Colorant For Cranberry Juice Cocktail,*" Journal of Food Science, 38, 464–467 teaches the extraction of Anthocyanin with acidified alcohol, then adsorption of the pigment on an ion exchange resin, and elute with an alcohol to recover the pigment. The anthocyanin produced by the above methods are impure, that is, it contains tannins, phenolic compounds and other organic acids which are also absorbed on the ionic exchange resin and eluted with the anthocyanin. When sulfur dioxide is added to anthocyanin it only reacts with the monomeric anthocyanin pigment and forms a uncharged anthocyanin sulfur dioxide complex. When an acidified alcohol is added to anthocyanin it mainly facilitates the extraction of the anothocyanic pigment from its source. Adding an acidified alcohol to an anthocyanin-sulfur dioxide complex simply breaks the anthocyanin-sulfur dioxide bond leaving a charged anthocyanin pigment which can be adsorbed on an ion exchange resin. The present invention on the other hand forms an uncharged anthocyanin-($HSO_3$) complex which is adsorbed on a non-ionic exchange resin. Although, Phenolic compounds and tannins are adsorbed on this resin, the addition of acidified alcohol to this resin, selectively breaks the anthocyanin-($HSO_3$) complex, thus eluting essentially purified monomeric anthocyanic pigments.

It is an object of the present invention to provide a novel method of obtaining monomeric anthocyanin colorant having a high color strength. It is a further object to provide a process for concentrating anthocyanin colorant by removing sugars, organic acids, polymerized anthocyanin pigment and other water-soluble non-pigmented material from the pigment material in grape pomace, thus concentrating the pigment. It is a further object to provide an anthocyanin colorant of high color strength and to provide food products colored thereby.

BRIEF SUMMARY OF THE INVENTION

The foregoing and other objects which will be apparent to those of ordinary skill in the art are achieved in accordance with the present invention by providing a method of producing an anthocyanin colorant from grape pomace which comprises: contacting grape pomace with an aqueous extraction solvent containing $HSO_3^-$ ions to extract anthocyanin and to form an uncharged anthocyanin-($HSO_3$) pigment complex; removing said aqueous extraction solvent from said grape pomace; removing undissolved solids from said aqueous extraction solvent, contacting said aqueous extraction solvent with a non-ionic adsorbent to adsorb said anthocyanin-($HSO_3$) complex along with polymerized anthocyanin pigment from said aqueous extraction solvent, separating said aqueous extraction solvent and said adsorbent, washing said adsorbent with water to remove soluble sugar, organic acid and other water soluble non-pigmented material, contacting the separated adsorbent with an acidified organic eluant which breaks the anthocyanin-($HSO_3$) complex to produce a product solution comprising monomeric anthocyanin in its cationic form (free of said $HSO_3^-$ ions) which dissolves in said organic eluant, and separating said product solution from said adsorbent, by providing a high tinctorial strength monomeric anthocyanin colorant produced by the foregoing process, and by providing food products colored therewith.

DETAILED DESCRIPTION

In accordance with the present invention, grape pomace is contacted with an aqueous extraction solvent containing $HSO_3^-$ ions. Grape pomace is widely available as a waste material, particularly in wine-making regions, and is preferably de-seeded prior to extraction. De-seeding may be effected in any conventional manner such as by screening.

The de-seeded grape pomace is then subjected to extraction by contact with an aqueous extraction solvent containing $HSO_3^-$ ions at room temperature for up to 24 hours. The amount of $HSO_3^-$ ions, expressed as weight percent $SO_2$ based on the weight of the solids content of the grape pomace, should not exceed about 0.5% and is preferably between 0.05 and 0.2%.

The aqueous extraction solvent preferably contains one or more organic solvents miscible in water and capable of dissolving anthocyanins. Preferably, the amount of organic solvent is 25–75% by volume based on the volume of the extraction solvent. While various solvents can be used, ethyl alcohol is preferred, and the preferred extraction solvent contains 55 parts by volume water, 45 parts by volume alcohol, and $HSO_3^-$ ions in an amount of up to 0.5% by weight $SO_2$ based on the amount of grape pomace solids in contact with the extraction solvent.

It is preferred to use a minimum amount of extraction solvent and a practical minimum is about ½ or 1 volume of extraction solvent per volume of grape pomace treated. Larger quantities may, of course, be used, but it is preferred to use a minimum amount to minimize the cost of recovery of the pigment. In general, a suitable range is 0.5 to 5 volumes of extraction solvent per volume of grape pomace treated, and a preferred range is about 1 to 2.

The $HSO_3^-$ ions can be added in any convenient manner such as by the addition of sodium meta bisulfite, sodium bisulfite, sulfurous acid and the like. However, it is preferred to simply dissolve sodium metabisulfide into the aqueous extraction solvent.

The duration of the contact time between the grape pomace and the extraction solvent is preferably kept to a minimum for purposes of economy. A few hours is usually sufficient and a preferred minimum soak time is about two hours. For most operations, over-night soaking will be convenient and is preferred for that reason. In general, a soak time of from 2 to 16 hours will be suitable and a preferred range is from 2 to 8 hours.

The extract solution, which contains the anthocyanin-($HSO_3$) complex, polymerized anthocyanin pigment, acids, sugars etc., is then removed from the pomace in any convenient manner such as by pressing. The extract solution is then filtered to remove undissolved solids and this is done in any convenient manner, such as in a multi-plate filter press.

After filtering, the extract solution is then contacted with a non-ionic adsorbent to adsorb the anthocyanin-($HSO_3$) complex and polymerized anthocyanin pigment, phenolic acids and tannin from the solution. Among the high surface area, non-ionic materials useful as adsorbents herein are any of the known non-ionogenic, macroreticular resins. For example, there may be used the granular cross-linked polymers of this character prepared by suspension polymerization of polymerizable ethylenically unsaturated molecules comprising about 2 to 100, preferably at least 50, weight percent of at least one poly(vinyl)benzene monomer selected from the group consisting of divinylbenzene, trivinylbenzene, alkyldivinylbenzenes having from 1 to 4 alkyl groups of 1 to 2 carbon atoms substituted in the benzene nucleus and alkytrivinyl benzenes having 1 to 3 alkyl groups of 1 to 2 carbon atoms substituted in the benzene nucleus. Besides the homopolymers and copolymers of these poly(vinyl)benzene monomers, one or more of them may be copolymerized with up to 98%, preferably less than 50%, (by weight of the total monomer mixture) of (1) monoethylenically unsaturated monomers (e.g., styrene), or (2) polyethylenically unsaturated monomers other than the poly(vinyl) benzenes just defined (e.g., divinylpyridine), or (3) a mixture of (1) and (2). Macroreticular acrylic and/or styrene and/or divinylbenzene adsorption resins devoid of ion exchange functionality have proven particularly useful in the process of this invention.

Adsorbent resins of the aforementioned-type are known and commercially available and more fully described in U.S. Pat. No. 3,531,463 to Gustafson (Rohm & Haas Company) which is hereby incorporated by reference.

Typically, the adsorbent polymer, which under most conditions is of 16 to 100 mesh in particle size, and may be as small as about 400 mesh, has a porosity of at least 10% (percent volume of pores in the resin body or bodies) and a surface area of at least 10 square meters per gram of the resin (up to 2,000 square meters per gram). Cross-linked resins having solubility parameters (units: calories/cc) of at least about 8.5 and up to 15 or more are suitable for use. The preferred resin size is from about 40–50 mesh (U.S. Standard).

Adsorption of the anthocyanin complex may be carried out in a simple batch operation, in a continuous procedure, or in various other operating modes available to those skilled in the art. In a fixed-bed batch operation, the adsorbent may be supported in a suitable cell or vessel which in most practical operations normally takes the form of a tower or column suitably packed with the adsorbent which may be of any suitable size or mesh. The extract is passed through the adsorption bed at a suitable rate, preferably from top to bottom, so that the complex may be adsorbed.

The extract solution will normally have a solids content of 5 to 30% by weight, depending largely on the volume ratio or extraction solvent to grape pomace. When the extract contacts the adsorbent, solids will be adsorbed until the adsorbtion capacity of the adsorbent medium in the particular system is reached. When adsorption occurs in a single column, it will normally be the practice to cut off the flow of extract into the column before a significant amount of anthocyanin complex is detected exiting from the column. In this manner, a substantially anthocyanin-free extract is obtained which may be recycled for additional processing if desired.

In addition to the anthocyanin-($HSO_3$) complex and polymerized anthocyanin pigment, various other non-ionic compounds present in the extract are also adsorbed. For example, sugars and solubilized proteins may be present in the adsorbed material. However, the advantage of the process described herein is that the anthocyanin-($HSO_3$) complex and polymerized anthocyanin pigment present in the aqueous extract are selectively adsorbed on the adsorbent, while the other non-ionic water soluble compounds are removed in the water washing step.

The adsorption bed containing the adsorbed anthocyanin complex and polymerized anthocyanin pigment are rinsed with water in order to remove from the adsorbent water soluble non-pigmented material, such as sugar, organic acid and solid particles which are merely adhered to the particle surfaces and have not, in fact, been adsorbed. In column operation, this water rinse will normally be effected by passing tap water (about 15° C.) through the adsorbent bed.

The adsorbed anthocyanin-($HSO_3$) complex is then eluted from the adsorbent with an acidified organic solvent leaving the polymerized anthocyanin pigment behind. The preferred solvent is 100% ethanol acidified with a small amount of a mineral acid. The acid functions to break the anthocyanin-($HSO_3$) complex such that monomeric anthocyanin free of $HSO_3^-$ ions, is eluted from the adsorbent. Various organic solvents may be used for anthocyanins extraction, but of these, alcohols such as methanol, ethanol, n-propanol, isopropanol, and mixtures thereof, are preferred. The elutant is preferably anhydrous, but a small quantity of water, such as that which is introduced when adding concentrated acid to acidify the elutant, is tolerable. Additional water is also present, of course, in the adsorbent bed. In general, the water content of the elutant as initially used is not more than about 2% by volume and preferably not more than about 1% by volume.

The acid used to acidify the elutant can be any food grade acid of sufficient acidity (pH<3.5) to effect break-up of the monomeric anthocyanin-($HSO_3$) complex such that the monomeric anthocyanin which is eluted is free of $HSO_3^-$ ions. Mineral acids are suitable and, of these, hydrochloric acid is preferred. The amount of acid can vary considerably but, in general, a sufficient amount is added to obtain a pH of less than about 3.5.

Recovery of the anthocyanin from the elutant can be accomplished in any convenient manner such as by evaporation, distillation, spray drying, freeze drying, and the like. Preferably, recovery is accomplished by evaporation to effect concentration of the solution followed by spray drying with a suitable carrier such as dextrin.

EXAMPLE 1

De-seeded grape pomace is soaked with an equal volume of extracting solvent which contains approximately 0.075% w/v $HSO_3^-$, 40% v/v ethanol and 60% v/v water. After overnight soaking, the pomace is pressed to extract the solvent containing an anthocyanin-($HSO_3$) complex. After filtering to remove undissolved solids, the extract phase is passed through a fixed bed (2.5 cm diameter by 120 cm high) of a non-ionic, high surface area, macroreticular, styrenedivinylbenzene copolymer, prepared by suspension polymerization of a monomer fraction containing in excess of 80% by weight divinylbenzene. This adsorbent polymer is employed in the form of 20 to 50 U.S. mesh size beads and is available from Rohm and Haas Co., Philadelphia, PA 19105 under the commercial designation "Amberlite XAD-4." Thereafter, 2 bed volumes of water, at about 15° C., are passed through the resin bed at the rate of 1 bed volume per hour to remove water soluble non pigmented material, sugar, organic acids and the nonadsorbed solids. The adsorbent bed is then eluted with a solution of 100% ethanol containing 0.1% by weight of concentrated hydrochloric acid. The elutant, which contains anthocyanin free of $HSO_3^-$ ions is then evaporated in a rotary evaporator and spray dried with a dextrin carrier. The dried product contains about 60% grape solids and 40% dextrin carrier and the overall yield of grape solids based on the solids content of the pomace is about 10%. The colorant is many times stronger in color than colorants obtained by conventional extraction methods. The strong coloration of the present product is believed to be due at least in part by the fact that sugars, organic acids and other non-pigmented materials are separated from the anthocyanin colorant during the process.

EXAMPLE 2

The grape colorant of Example 1 is used to color a dry beverage mix having the following formula:
Malic Acid—3.15 grams;
Monocalcium Phosphate—2.65 grams;
Cherry Flavor (IFF 13540603)—0.32 grams;
Grape Process of Example 1—0.41 grams;
Vitamin C—0.08 grams;
FD&C Blue #1—0.0002 grams.
When admixed in 2 quarts of water, the beverage is comparable in color to a beverage made from the same mix in which FD and C Red #40 is used in an amount of 0.14 grams.

What is claimed is:

1. A method for producing highly colored anthocyanin colorant from grape pomace which comprises:
   Contracting grape pomace with an aqueous extractor solvent containing $HSO_3$ ions at room temperature to extract anthocyanin to form an unchanged anthocyanin-($HSO_3$) complex;
   Removing said aqueous extraction solvent from said grape pomace;
   Removing undissolved solids from said aqueous extraction solvent;
   Contacting said aqueous extraction solvent with a non-ionic adsorbent to adsorb said anthocyanin pigment from said aqueous extraction solvent;
   Separating said aqueous extraction solvent and said adsorbent;
   Contacting the separated adsorbent with water having a temperature ranging from 10° to 20° C. to remove water soluble non-pigmented material;
   Contacting the separated adsorbent with an eluent acidified with an acid having a pH ranging from 1 to 4, thereby breaking the anthocyanin-($HSO_3$) complex, to produce a product solution comprising monomeric anthocyanin in its cationic form (free of said $HSO_3$ ions) which dissolves in said organic eluent; and
   Separating said product solution from said adsorbent to produce a high tinctorial strength monomeric anthocyanin pigment.

2. A method according to claim 1 wherein the acid used to acidify the eluant has a pH of 3.5.

3. A method according to claim 1 wherein grape pamace is contacted with an aqueous extraction solvent containing $HSO_3^-$ ions for up to 36 hours.

4. A method according to claim 1 further comprising the step of removing said organic eluant from said product solution to provide a product comprising anthocyanin pigment.

5. A method according to claim 4 wherein at least a portion of said organic eluant is removed by evaporating said product solution.

6. A method according to claim 4 wherein a portion of said organic solvent is removed by evaporation to provide a concentrated product solution and further portion is removed by spray drying said concentrated product solution to provide a dry, particulate anthocyanin pigment.

7. A method according to claim 1 wherein the $HSO_3$ ions are present in said aqueous extraction solvent in an amount of up to 0.05% expressed as weight percent $SO_2$ based on the weight of the solids content of the grape pomace.

8. A method according to claim 7 wherein said aqueous extraction solvent comprises 25–75% by volume an organic solvent miscible in water and capable of dissolving anthocyanins.

9. A method according to claim 1 wherein said non-ionic adsorbent comprises a macroreticular resin.

10. A method according to claim 1 wherein said acidified organic eluant comprises an organic alcohol, a mineral acid, and not more than about 2% water.

11. The product of the method of claim 1.

* * * * *